United States Patent [19]

Kawakubo et al.

[11] Patent Number: 5,548,454
[45] Date of Patent: Aug. 20, 1996

[54] INFORMATION RECORDING DISK, ITS PRODUCTION METHOD AND RECORDING APPARATUS

[75] Inventors: Youichi Kawakubo, Tokorozawa; Yoshio Kawamura, Kokubunji; Yosuke Seo, Sagamihara, all of Japan

[73] Assignee: Hitachi, Ltd., Tokyo, Japan

[21] Appl. No.: 470,335

[22] Filed: Jan. 25, 1990

[30] Foreign Application Priority Data

Jan. 27, 1989 [JP] Japan .................................. 1-16443

[51] Int. Cl.⁶ ........................... G11B 15/18; G11B 5/596
[52] U.S. Cl. ..................... 360/72.1; 369/58; 360/77.02; 360/135; 360/98.01; 360/99.12
[58] Field of Search ............................. 360/78.04, 98.03, 360/99.12, 133, 72.1, 135, 98.01, 77.02; 369/250, 270, 271, 135, 58

[56] References Cited

U.S. PATENT DOCUMENTS

| | | | |
|---|---|---|---|
| 4,670,803 | 6/1987 | DeMoss et al. | 360/98.03 |
| 4,697,216 | 9/1987 | Tsukahara | 360/99.12 |
| 4,730,300 | 3/1988 | Ramoshita et al. | 369/270 |
| 4,807,063 | 2/1989 | Moteki | 360/78.04 |
| 4,910,616 | 3/1990 | Sirai et al. | 360/77.08 |
| 5,023,857 | 6/1991 | Verboom | 369/44.25 |
| 5,050,013 | 9/1991 | Holsinger | 360/78.04 X |
| 5,072,438 | 12/1991 | Suzuki et al. | 360/133 X |
| 5,111,446 | 5/1992 | Fujita | 360/133 X |

FOREIGN PATENT DOCUMENTS

| | | | |
|---|---|---|---|
| 59186181 | 10/1981 | Japan . | |
| 57-54872 | 11/1982 | Japan . | |
| 57-212625 | 3/1983 | Japan . | |
| 58-14336 | 4/1983 | Japan . | |
| 58-211327 | 12/1983 | Japan | 369/280 |
| 58-169354 | 1/1984 | Japan . | |
| 61-54073 | 3/1986 | Japan | 360/99.12 |
| 61-236047 | 3/1987 | Japan . | |
| 61-265748 | 4/1987 | Japan . | |
| 61-280026 | 5/1987 | Japan . | |
| 944511 | 12/1963 | United Kingdom | 369/280 |

*Primary Examiner*—Andrew L. Sniezek
*Attorney, Agent, or Firm*—Fay, Sharpe, Beall, Fagan, Minnich & McKee

[57] ABSTRACT

In the information recording disk, the positioning signal of the information convertor is provided permanently, as a change in shape or material, to the front and reverse surfaces of the disk substrate and their eccentric distances from the center position is made to be smaller than half the repeating unit length of the positioning signal of the information convertor in the radial direction. The start position of the positioning signal in the circumferential direction is preferably made to be coincident on the front and reverse surfaces of the disk substrate within 10 μm. The position reference for aligning the position in the radial direction or the position reference for aligning the rotation angle position in the circumferential direction is preferably disposed on the inner diameter portion or outer diameter portion of the disk substrate, respectively, and these position references can be accomplished by disposing at least one notch on the inner or outer peripheral edge portion of the disk substrate.

2 Claims, 8 Drawing Sheets

INFORMATION RECORDING DISK, ITS PRODUCTION METHOD AND RECORDING APPARATUS

BACKGROUND OF THE PRESENT INVENTION

This invention relates to a disk information recording medium. More particularly, the present invention relates to an information recording disk, which limits the eccentric distance between the center position of a positioning signal for an information convertor and the center position of rotation of an information recording disk and is suitable for positioning highly accurately and at a high speed the information convertor, to its production method and to an information recording apparatus using the information recording disk.

When information is recorded or reproduced by positioning a rotary magnetic disk and a radially moving information convertor, the information convertor must be positioned highly accurately to a desired information track. The positioning method of the information convertor has changed from an early open loop method to a closed loop servo method using a positioning signal. To obtain still higher accuracy, attempts have been made, recently, to dispose the positioning signal on the recording track, or very close to it on the surface on which the information is to be recorded and reproduced. The positioning signal is detected by the information convertor itself, or a position reference detector disposed on the information convertor, or very close to it.

In optical disk apparatuses such as a compact disk (CD), for example, tracking grooves are formed on the recording surface and information pits are formed on, or in the proximity of, the grooves. The information convertor is positioned to this tracking groove and records or reproduces the information pit at a predetermined position.

In magnetic disk storage, an apparatus for accomplishing a high track density uses a positioning signal at a predetermined angle position of each recording track, detects this positioning signal by a magnetic head for recording and reproducing the information, and positions the magnetic head to the recording track by use of this detection signal, as disclosed, for example, in Japanese Patent Publication No. 54872/1982.

SUMMARY

In the optical disk apparatus, for example, reproduction or recording/reproduction of the information on the optical disk is onducted at present by use of one information convertor. For this reason, the eccentric distance between the information recording track and the rotary spindle of the disk has not been a great problem. However, as the information capacity becomes greater, it will become necessary to fit a plurality of information recording surfaces to the same rotary spindle and to record and reproduce the information by a plurality of information convertors which are moved integrally on the same moving mechanism. In this case, since the positioning signal on each information recording surface is formed at the time of production of the positioning information recording disk, these positioning signals have large eccentric distances between them. When the information convertor is electrically switched to record/reproduce the information on the different recording surfaces, the eccentric distance described above must be corrected and the switching time is long. Furthermore, if the angle position of the information recording start point on each information recording surface is different, a waiting time until the information convertor and the information recording disk reach the desired rotating angle position is further necessary.

If the rotating speed of the information recording disk becomes high, the difficulty of following, with the eccentric distance described above, becomes great even in the conventional apparatus where one information convertor is used for one surface, and the drop of following accuracy occurs in the information recording track.

In the recording disk apparatus, the positioning signal has been recorded conventionally by a magnetic head of a write apparatus for the positioning signal after fixing the disk to the spindle, even where the positioning signal is disposed on each information recording surface. In this case, the eccentric distance of the positioning track on each information recording surface can be reduced but a long period of time is necessary for recording the positioning signal. Particularly when the track density becomes great and the total number of tracks increases, there occurs the problem that the information write time becomes extremely long. On the other hand, Japanese Patent Laid-Open No. 280026/1986 discloses a protecting pattern of the magnetic disk surface and also a positioning pattern. In this case, since the positioning signal is formed before the magnetic disk is fixed to the spindle, the difficulty of track following for each information recording surface is a problem in the same way as in the case of the optical disk apparatus described already.

It is an object of the present invention to eliminate the write time of the positioning signal after the assembly of the recording disk to an information recording apparatus and reduce the waiting time at the time of switching by an information convertor.

The objects of the present invention described above can be accomplished for an information recording disk by forming a substrate fixing position reference with a predetermined positional relationship with respect to a positioning signal of an information convertor on the information recording disk, at the time of production, and arranging this substrate fixing position reference of the information recording disk in a predetermined positional relationship with respect to the spindle of the information recording apparatus.

In an information recording disk of the type which obtains a positioning signal of an information convertor by the change of a surface shape or a material on the information recording surface of a disk substrate, the present invention provides an information recording disk characterized in that the eccentric distance between the center of rotation of the positioning signal and the center position of the inner or outer diameter of the disk substrate is made to be smaller than half the repeating unit length of the positioning signal of the information convertor in a radial direction.

In the information recording disk of the present invention, the positioning signal of the information convertor is provided to the front and reverse surfaces of the disk substrate and their eccentric distances from the center position is made to be smaller than half the repeating unit length of the positioning signal of the information convertor in the radial direction.

In the information recording disk of the present invention, the start position of the positioning signal of the information convertor in the circumferential direction is preferably made to be coincident on the front and reverse surfaces of the disk substrate within 10 μm.

In the information recording disk of the present invention, the position reference representing the position of the positioning signal of the information convertor in the radial direction is provided on the same plane as the information recording surface. The position reference for aligning the position in the radial direction or the position reference for aligning the rotation angle position in the circumferential direction is preferably disposed on the inner diameter portion or outer diameter portion of the disk substrate, respectively, and these position references can be accomplished by disposing at least one notch on the inner or outer peripheral edge portion of the disk substrate, for example.

In a production method of an information recording disk for obtaining a positioning signal of an information convertor on an information recording surface of the disk substrate by the change of a surface shape or a material, the production method of the present invention comprises forming a position reference for position alignment for either one, or both, of the position in the radial direction and the position of a rotating angle in the circumferential direction on the inner or outer diameter of the disk substrate, supporting a mask for fixing the positioning signal to the information recording surface, and aligning the corresponding position reference of the mask for fixing the positioning signal with the position reference in the radial direction and with the position reference of the rotating angle in the circumferential direction so that the eccentric distance between the center position of the inner or outer diameter of the disk substrate and the center position of the positioning signal is made to be smaller than half the repeating unit length of the positioning signal of the information convertor in the radial direction.

In the production method of the information recording disk, the information recording disk of the present invention can be produced by the steps of forming a notch or notches on either one, or both, of position alignment and angle alignment of the positioning signal for positioning the information convertor on the inner or outer diameter edge portion or portions of a disk blank leaving a finish allowance with respect to a final dimension, positioning the disk blank to the spindle of a rotary working machine having a position alignment portion corresponding to the notch for angle alignment of the disk blank by use of the rotary working machine so that it has a predetermined relation with the spindle, and conducting a surface finish of the inner and outer diameter edge portions of the disk blank.

In the production method of the information recording disk of the present invention, the information recording disk can be produced by the steps of forming a notch or notches on either one, or both, of position alignment and angle alignment of the positioning signal for the information convertor on the inner or outer diameter edge portion of a disk blank while leaving a finish allowance with respect to a final dimension, positioning the disk blank to the spindle of a rotary working machine having a position alignment portion corresponding to the notch/notches for angle alignment of the disk blank by use of the rotary working machine so that it has a predetermined relation with the spindle, and conducting a surface finish of the information recording surface of the disk blank.

Furthermore, the present invention includes an information recording apparatus for recording and reproducing information by fixing at least two information recording disks of the present invention to the same spindle, which includes making the eccentric distance of the positioning signal of the information convertor on the information recording surface of each of the information recording disks smaller than half the repeating unit length of the positioning signal of the information convertor in the radial direction.

In the information recording apparatus of the present invention, the error of the rotation start position of the positioning signal of the information convertor on the information recording surface of each information disk is preferably below 20 µm.

The information recording of the present invention includes positioning a positioning track on the information disk surface to the center of an information disk holding portion with an error smaller than half the repeating unit length of the positioning signal of the information convertor in the radial direction by notches on the inner diameter edge portion of the information recording disk and projections disposed on the information recording disk holding portion to correspond to the notches.

The information recording apparatus of the present invention includes a cylindrical hub for supporting the information recording disks, at least one projection formed on the surface of the cylindrical hub in parallel with the axis of rotation and aligning the horizontal position by biasing the notch at the inner diameter portion of the plurality of information recording disks to the projection of the cylindrical hub.

Furthermore, the information recording apparatus of the present invention includes positioning accurately the angle positions of the positioning tracks of the plurality of information disks in the circumferential direction by the notches of the inner diameter edge portions of the information recording disks and the projections of the cylindrical hub corresponding thereto, and preferably includes biasing the projections of the cylindrical hub to the notches, disposed at substantially the opposite positions to the notches by use of a flexible member such as a leaf spring.

In the information recording disk of the present invention which holds a positioning signal of an information convertor on the information recording surface of a disk substrate by the change of a surface shape or a material, the eccentric quantity between the center of rotation of the positioning signal and the center position of the inner or outer diameter of the disk substrate is preferably smaller than half the repeating unit length of the positioning signal of the information convertor in a radial direction by use of a fixing position reference of the disk substrate having a predetermined relation with the center of the position reference track on the information recording disk. Accordingly, the information convertor can be positioned rapidly to the position of a target recording track.

In the recording disk apparatus, having a carriage that moves a plurality of information converters simultaneously, it is necessary to consider according to the present invention the difference in eccentric distances of the positioning signal center of symmetry among information carrying surfaces (including recording disks having information carrying surfaces on opposed surfaces of a disk). In this case, it is necessary to select information recording disks having information carrying surfaces where the maximum eccentric distance among positioning signal centers of symmetry of said information carrying surfaces is smaller than half the repeating unit length of the positioning servo signal means in the radial direction and to fix the recording disks on the recording apparatus.

To omit the selection process before fixing recording disks on the recording apparatus, recording disks having the eccentric distance between the positioning signal center of symmetry from the center of rotation smaller than a quarter of the repeating unit length of the positioning servo signal means in the radial direction should be made in the manufacturing process of the recording disks.

In the recording disk apparatus, having a carriage that moves a plurality of information converters independently from each other, it is not necessary to consider the difference in eccentric distances of positioning centers of symmetry among information carrying surfaces. In this case, the merit of the present invention in making the eccentric distance between positioning signal centers of symmetry from the center of rotation smaller than half the repeating unit length of the positioning servo signal means in the radial direction is still attainable.

BRIEF DESCRIPTION OF THE DRAWINGS

Further objects, features and advantages of the present invention will become more clear from the following detailed description of a preferred embodiment, shown in the drawing, wherein.

DETAILED DESCRIPTION OF THE PREFERRED EMBODIMENT

Figure 1:
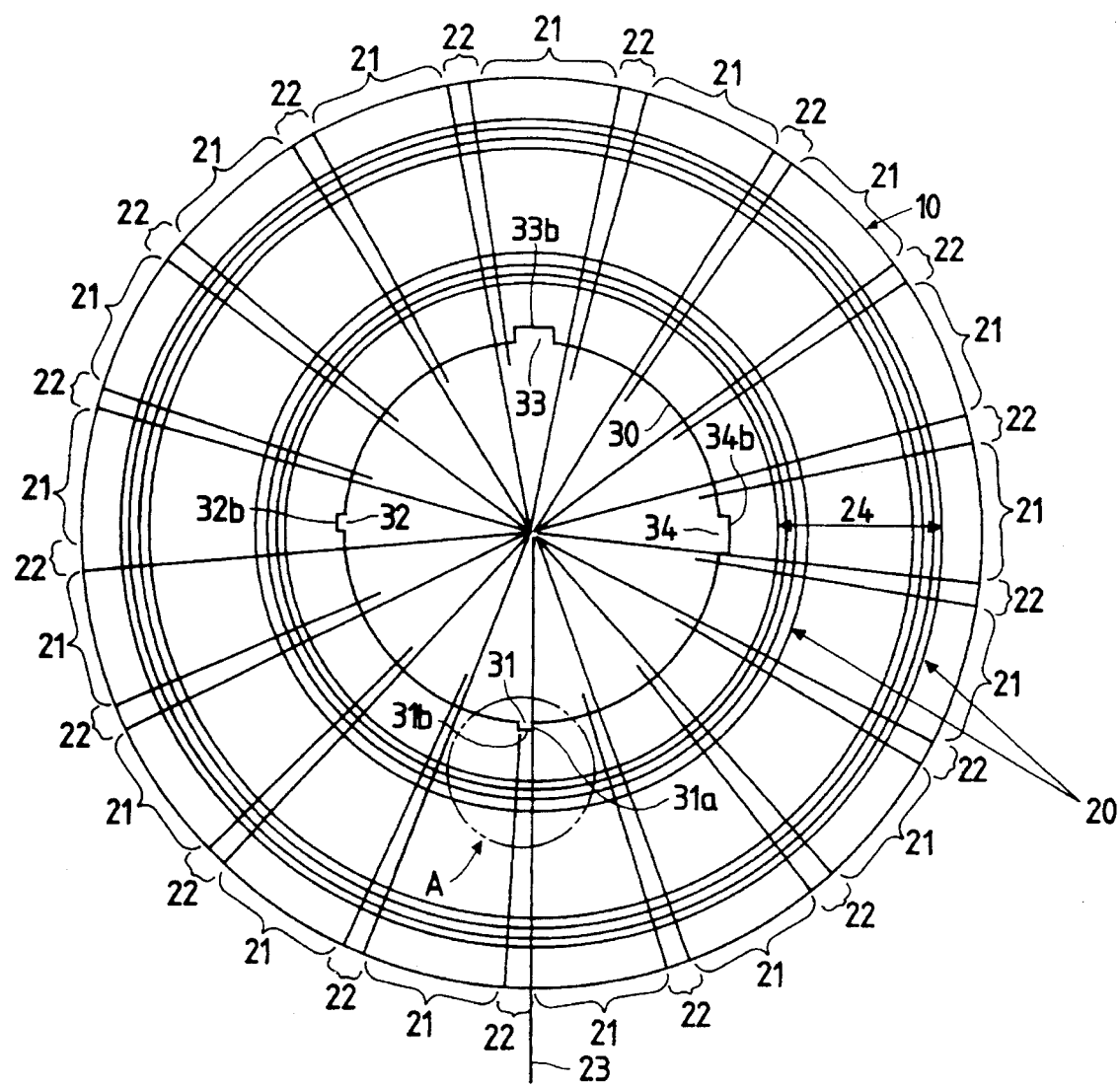
FIG. 1 is a schematic view showing the structure of a magnetic disk illustrating an Embodiment of the present invention.

FIG. 1 shows the information recording surface of the magnetic disk 10 illustrated in this embodiment, by way of example. Recording tracks 20 are formed on the information recording surface within a recording zone 24, with a track pitch of 10 μm, and concentrically with one another with a predetermined gap between them. Each recording track 20 is alternately composed of servo sectors 22 and data sectors 21 in the clockwise direction from an index line 23 as the reference of the start of recording. In this embodiment, one track circumference consists of 17 sets of servo sectors 22 and data sectors 21. Four notches 31, 32, 33 and 34 are formed at an inner diameter portion 30 having a radius of 20 mm.

Figure 2:
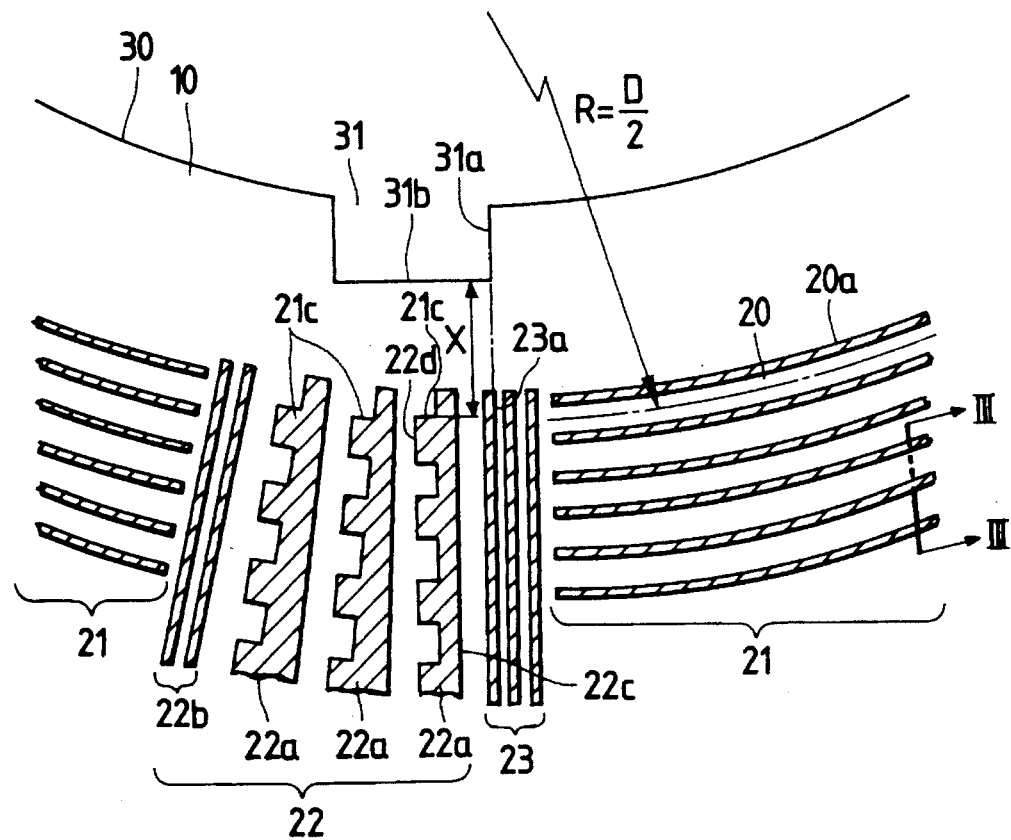
FIG. 2 is an enlarged view of a portion A shown in FIG. 1.
Figure 3:
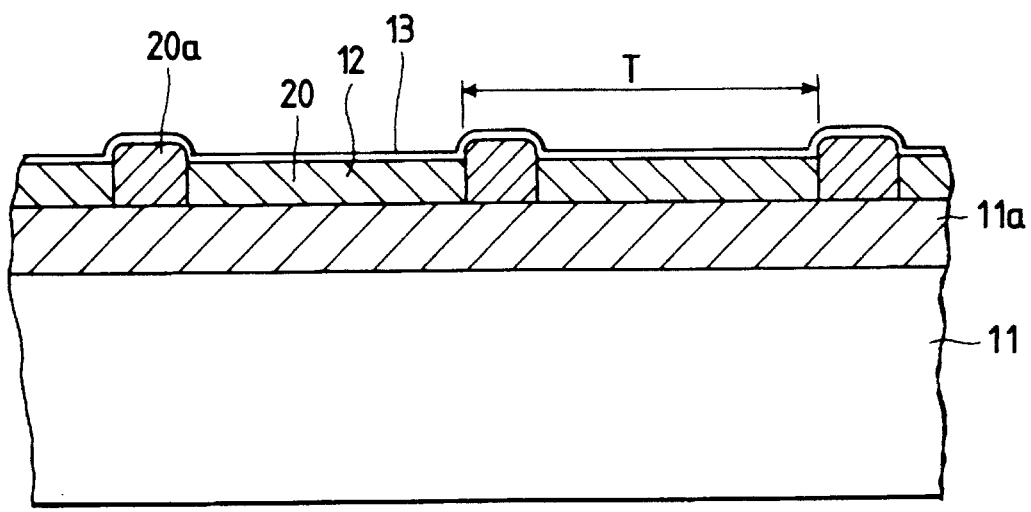
FIG. 3 is a schematic view showing the cross-sectional shape of the recording zone of the magnetic disk, taken along dotted line III—III in the radial direction of the disk shown in FIG. 2.

FIG. 2 is an enlarged view of the portion A of FIG. 1. In the data sector 21, the recording tracks 20 are formed 7 μm wide with a predetermined 3 μm wide gap in such a manner as to interpose track separators 20a between them. The index line 23 consists of patterns in the radial direction having an equal angular gap of 5 μm wide. Only three patterns are shown in FIG. 3. The servo sector 22 consists of servo information 22a and servo separators 22b for separating the servo sector from the data sector 21. The servo information 22a consists of a leading edge portion 22c extending in the radial direction of the magnetic disk 10 and a trailing edge portion 22d having a corrugated pattern which comes in and out for each track center and repeats this every two track pitches. Each servo information 22a consists of three equidistant 10 μm gap patterns extending in the radial direction. The servo separator 22b consists of two equidistant 5 μm wide patterns extending in the radial direction and analogous to the index line 23. When the radius R of the innermost recording track 20 of the recording zone 24 of the magnetic disk 20 to the center line is 38 mm, the total circumference of the inner track containing seventeen sets of data sectors, servo sectors 22 and index lines 23 is 239 mm, and 1% of 239 mm/17=14 mm, that is, 0.14 mm is preferred.

FIG. 3, as the circumferential width of each set of one servo sector 22 and one index line 23, is a cross sectional view of the recording zone 24 in the radial direction. In the drawing, an under layer 11a consisting of a 0.5 μm-thick Cr film is disposed on a disk substrate 11 made of Al, and Co-Ni magnetic films (0.05 μm thick and 7 μm wide) 12 constituting the recording tracks (track pitch T=10 μm) and the track separators (0.1 μm thick and 3 μm wide) 20a are alternately formed [TPI (Track/inch)=2,500] on the surface of the under layer 11a. Furthermore, a protective film 13 consisting of a 0.03 μm-thick carbon is formed on the top of the above mentioned assembly. The track separator 20a projects 0.05 μm from the magnetic film portion 12. The pattern portions of the servo information 22a and index line 23 in FIG. 2 are all formed in the same way as the track separators 20a and each projects by a predetermined distance (e.g. 0.05 μm) from the surface of the magnetic layer 12.

The notch 31 shown in FIG. 2 is cut 1 mm deep into the inner diameter portion 30 of the magnetic disk 10 and is formed in such a manner that the leading edge 31a of the notch 31 exists on the extension (represented by one dot-chain line in FIG. 2) of the leading edge 23a of the last index line 23 in the clockwise direction among the patterns of the index line 23, and thus the notch and index line 23 have a predetermined value of relative positional relation.

Figure 5:
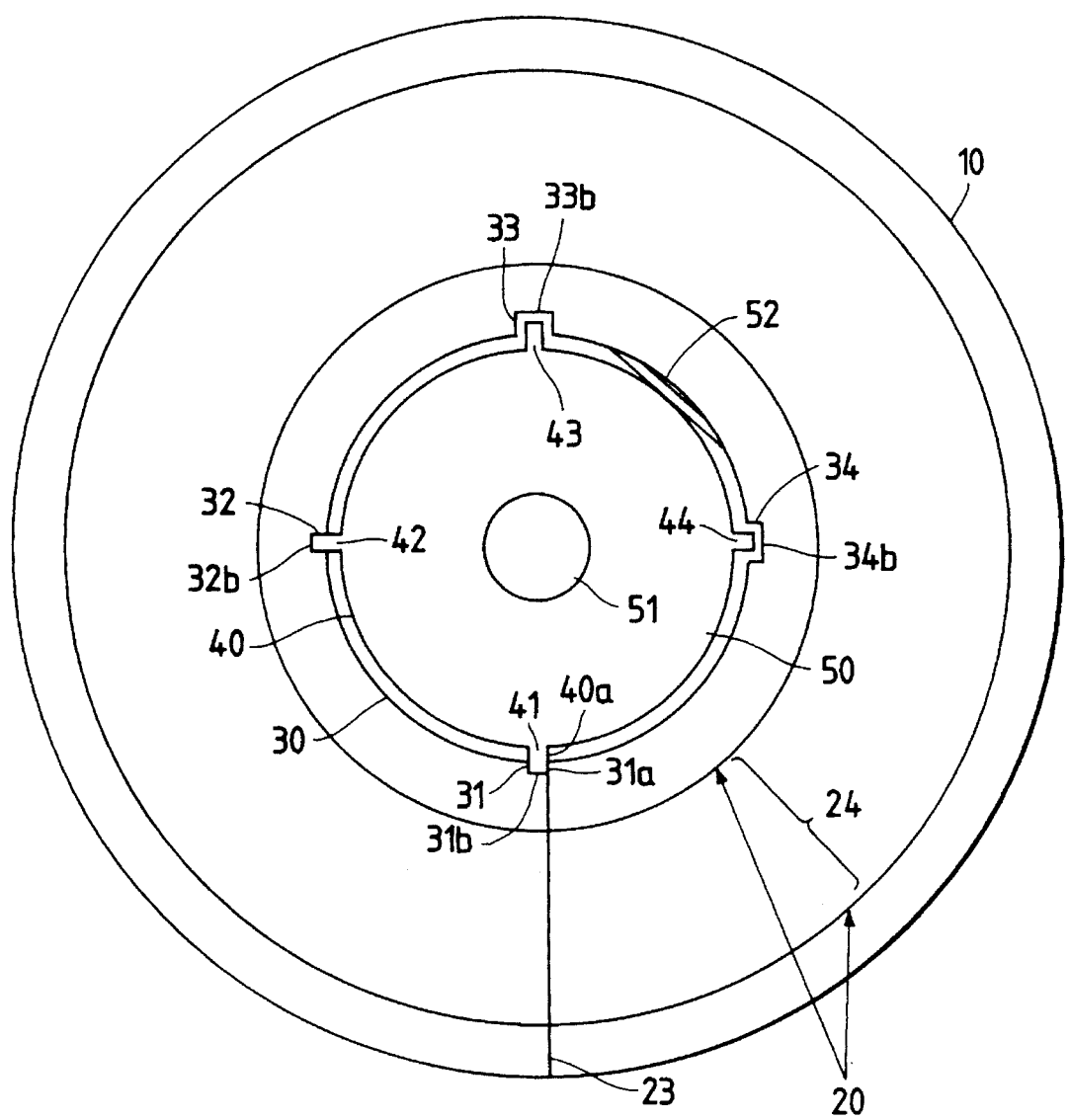
FIG. 5 is a schematic view showing the magnetic disk of the present invention fixed to a hub of a recording apparatus.

The bottom 31b of the notch 31 is spaced a predetermined distance X of 17 mm from the innermost corrugation 21c of the servo information 22a of the servo sector 22. As shown in FIGS. 1 and 5, the notch 32 is cut into the inner diameter portion 30 at the position 90° clockwise from the notch 31, and the bottom portion 32b of notch 32 is spaced the distance X of 17 mm from the center position (circumferential dot-dash line in FIG. 2 at radius R) of the information track 20 corresponding to the innermost corrugation 21c. The notches 33 and 34 are formed on the inner diameter portions 30 on the diameter lines spaced apart by 180° from the notches 31 and 32, respectively. The depth of these notches 33, 34 from the inner diameter portion 30 to the bottom in the radial direction is greater than the depth of the notch 31 (e.g. 1 mm).

The width of the notches 32, 33 and 34 in the tangential direction is greater than that of the notch 31.

The opposite surface of each magnetic disk 10 is symmetric with the just described disk surface with respect to a neutral center plane that is in parallel with the disk surface.

Figure 4:
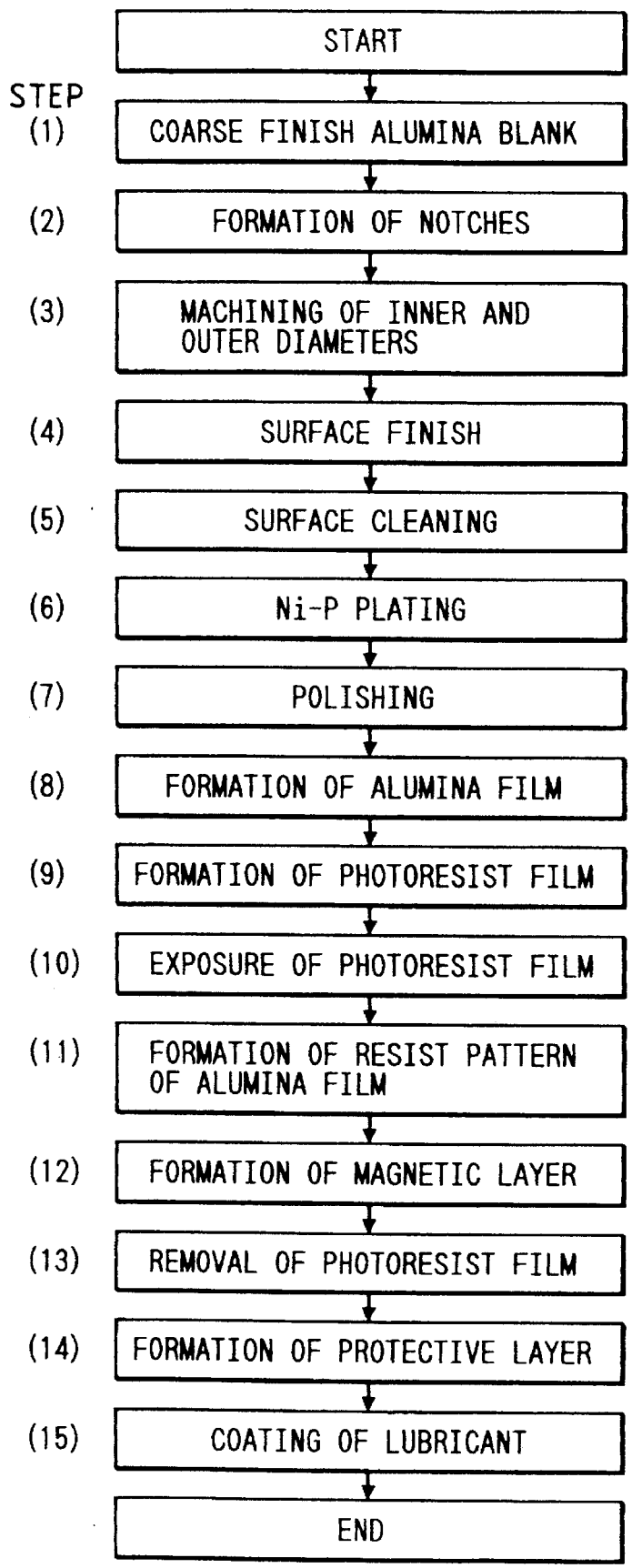
FIG. 4 is a flow chart showing the production steps for the magnetic disk of the present invention.

Next, an embodiment of the production method of the information recording disk in accordance with the present invention will be explained. FIG. 4 shows an example of the production steps of the magnetic disk in accordance with the method of the present invention.

At step (1), rough machining of a press-punched aluminum blank is conducted so that surface coarseness, plate thickness and inner and outer dimensions are finished to be greater than finish dimensions for the thus formed substrate.

At step (2), the narrow notch 31 and the wide notches 32, 33 and 34 are cut into the inner diameter portion 30 of the substrate. The width of each of the notches 32, 33 and 34 is greater by 0.5 mm than that of the notch 31. The notches 33 and 34 are cut to be 0.5 mm deeper than the notches 31 and 32 so that the radial distance (bottom to bottom) $D_1$ between the notches 31 and 33 and between the notches 32 and 34 is $D_1 = D - (2X) + 0.5$ mm, where D is the diameter of the innermost track, e.g., D=38 mm×2=76, and X is defined in FIG. 2, e.g., X=17 mm.

Next, at step (3), the bottom 31b of the notch 31 and the bottom 32b of the notch 32 are fixed to the projection of a lathe corresponding to a radius of rotation $R_1$ (=R - X) which is smaller by X (17 mm) than the radius R (38 mm;=D (76 mm)/2) to the center line of the innermost track. Then the inner and outer diameters are machined and their corners are chamfered.

The machining method of the inner and outer diameters and the formation method of the notches are not limited to the methods described above. It is possible, for example, to machine the inner and outer diameters first and then to machine highly accurately the notches by use of a jig borer, for example. In this case, a tool having a diameter of at least 2 mm is preferably used as the tool of the jig borer in order to improve machining accuracy.

At step (4), the bottom 31b of the notch 31 and the bottom 32b of the notch 32 are positioned on a projection of a precision diamond lathe and fixed by a vacuum chuck. The projection of the lathe is retreated and the surface is smoothed by diamond turning the first substrate in the same way as machining of the inner and outer diameters of the disk substrate. After one of the surfaces of the disk substrate is turned in this manner, the notches 31 and 32 are similarly positioned to the projection of the lathe to position the other surface of the disc substrate to be smoothed and turned after retreating the projection of the lathe. In this manner, both surfaces of the disk substrate are smoothed. Any oil or the like adhering to the substrate is cleaned and washed off in step (5).

At step (6), a base plating film consisting of Ni—P alloy is formed on both surfaces of the disk substrate by electrolysis plating.

At step (7), the Ni—P plating film on both surfaces of the disk substrate is smoothly polished.

At step (8), an alumina ($Al_2O_3$) film is formed in a thickness of 0.15 μm on the Ni—P plating film on both surfaces of the disk substrate.

Subsequently, a photoresist film is formed at step (9) by spin coating on the $Al_2O_3$ film on both surfaces of the disk.

This photoresist film is exposed to the patterns shown in FIGS. 1–3 at step (10) to form the resist patterns. At this time the disk substrate is held by support rods thinner than the disk at three points on the outer diameter of the disk substrate. Photomasks having set patterns are positioned to both surfaces of the disk substrate by the use of the leading edge portion 31a of the notch 31, the bottom portion 31b of the notch 31 and the bottom portion 32b of the notch 32 as the positioning references. After air between the two photomasks is evacuated, the photomasks are brought into close contact with the photoresist. Then, exposure is carried out by irradiating light to both surfaces. The diameter of the innermost recording track of the photomask is D (e.g. 76 mm) and the distance from it to the bottom portion 31b of the notch 31 and to the bottom portion 32b of the notch 32 is X (e.g. 17 mm).

Here, contact exposure is used, but as an alternative the set pattern can be exposed by projection exposure. At this time the disk substrate is positioned for each surface by pushing the three points, that is, the leading edge portion 31a of the notch 31 of the disk substrate, the bottom portion 31b of the notch 31 and the bottom portion 32b of the notch 32, to the reference pins of the exposure apparatus and the exposure pattern position is positioned to the reference mark of the exposure apparatus whose relative position with the reference pins is in advance clarified, by use of the alignment mark on the mask. After exposure of one surface, the other surface is exposed in the same way by use of the corresponding photomask.

The photoresist film exposed in the manner described above is developed at step (11) and the photoresist film at portions other than the set positions is removed. The alumina film at portions where the photoresist film does not remain is removed by plasma etching at step (11) to form a set alumina film pattern. At this time the photoresist film remaining on the alumina film is not removed.

Next, at step (12), a magnetic layer consisting of a thin metal film is formed in a thickness of 0.1 μm by sputter deposition on the surface of the disk. At this time the magnetic layer is formed on the Ni—P plating film from which the alumina film was removed by step 11 and on the photoresist film remaining on the alumina film after step 11.

At step (13), the photoresist film is removed by use of an organic solvent. At this time the magnetic layer formed on the photoresist film is removed together with the photoresist film and the alumina film is exposed. In this manner the patterns of the alumina film and magnetic layer are formed on the surfaces of the disk substrate.

At next step (14), a thin carbon film as a protective layer is formed in a thickness of 0.04 μm by sputter deposition on the entire surface of the alumina film and magnetic layer.

At final step (15), a small amount of a liquid lubricant is coated on the surface of the protective film to complete the magnetic disk of the present invention.

The steps 6 to 15 are basically well known as conventional for a thin film sputtered disk. The steps 8 to 14 are basically the production steps disclosed in Japanese Patent Laid-Open No. 0026/1986. The present invention differs from the basics of these steps in the step (10) for positioning the patterns formed on the surface of the magnetic disk to the notches 31 and 32 formed on the inner diameter portion 30 of the magnetic disk substrate 11. This step needs the formation step (2) of the notches and step (3) can insure concentricity of the inner and outer diameters of the magnetic disk by utilizing these notches. Furthermore, step (4) can limit the eccentric distance between the center of machining of the machining work and the recording tracks 20 to a low level.

Next, an example of the magnetic disk using the present invention will be explained.

The basic construction of the magnetic disk in this embodiment uses as a whole a substantially conventional apparatus but has its characterizing feature in the mechanism which fixes the magnetic disks to a rotatable hub.

FIG. 5 shows the magnetic disk as viewed from above the spindle 51. The hub 50 is fixed to the spindle 51. The diameter of the outer diameter portion 40 of the hub 50 is smaller by about 5 mm than the diameter (e.g. 40 mm) of the inner diameter portion 30 of the magnetic disk 10. The magnetic disk 10 comes into contact with the hub 50 only at the three points, that is, the leading edge portion 31a of the notch 31 in the inner diameter portion 30, the bottom portion 31b of the notch 31 and the bottom portion 32b of the notch 32, and thereby its horizontal position in the plane of FIG. 5 that is perpendicular to the spindle 51 is limited. Four projections 41, 42, 43 and 44 are formed on the outer diameter portion 40 of the hub 50 at positions 90° from each other. The outer diameter portion of each of these four projections is machined to define a radius of rotation $R_1$ when the spindle 51 is fixed to a bearing. This value can be known easily by measuring the gap of the outer diameter portions between the projections 41 and 43 or between the projections 42 and 44 that exist on the same diameter. As a result, high precision machining of $R_1$ can be guaranteed. The notch 31 is combined with the projection 41. The leading edge portion 41a of the projection 41 contacts the leading edge portion 31a of the notch 31 along surfaces that are highly precision-machined in parallel with the spindle 51.

The other projections 42, 43 and 44 are combined with the notches 32, 33 and 34, respectively. Since the width and depth of the notches 33 and 34 are greater than those of the notches 31 and 32, they do not come into contact with the projections 43 and 44 so that the horizontal position of the magnetic disk 10 can be restricted by the projections 41 and 42. A leaf spring 52 is interposed between the projections 43 and 44 and generates a force that biases the notches 31 and 32 toward the hub projection 41 and projection 42, to prevent the deviation of the magnetic disk 10 in the horizontal direction at the time of rotational acceleration or deceleration of the spindle 51, and to establish reliable contact with the three points described above.

The width of the notch 32 is greater by 0.5 mm than that of the notch 31. Therefore, when the leading edge portion 31a of the notch 31 is brought into contact with the leading edge portion 41a of the projection 41, the notch 32 contacts only at its bottom portion with the projection 42, and therefore the notch 32 and projection 42 do not interfere with the contacting between edge portions 31a and 41a.

Since the magnetic disk 10 is fixed to the hub 50 as described above, the bottom portions of the notches 31 and 32 are fixed onto the radius $R_1$ from the center of rotation. Since the innermost recording track is spaced by the distance X from the bottom portions of the notches 31 and 32, it is fixed at the distance of $R_1+X=R$ from the center of rotation. Since each recording track 20 inside the recording zone 24 on the magnetic disk 10 is formed equidistantly, the centers of all the tracks are in agreement with the center of rotation. This also holds true exactly of the plurality of magnetic disks 10 stacked on the same hub 50, and in this manner, the recording tracks on these magnetic disks 10 can be assembled with all their centers in agreement with the center of rotation.

As to the angular position of the index lines 23 inside the plane of the magnetic disk 10, since the leading edge portion 31a of the notch 31 on the extension of the index line is brought into contact with and biased to the leading edge portion 41a of the projection 41 formed in parallel with the spindle, the plurality of magnetic disks stacked on the same hub 50 can all be set to the same angular position.

Since the notches 31 and 32 are positioned by the projections 41 and 42 as described above, respectively, these plurality of magnetic disks 10 are stacked on the hub 50 while inserting therebetween spacers having a predetermined size in order to keep the gaps between adjacent disks constant, and the stacked disks and spacers are fixed by a fixing screw from above through a hub cover. The magnetic head is floated by rotating the magnetic disk assembly. The alumina pattern inclusive of the track separators 20a project by 0.05 μm above the top surface of the magnetic layer 12, but this does not hinder floating of the magnetic head if the minimum value of the floating spacing is above this 0.05 μm value.

Under this state, the position of the servo information 22a of each servo sector on the magnetic disk 10 must be detected. Therefore, a predetermined current is caused to flow through each magnetic head in the same direction so as to magnetize the adjacent magnetic layer in the same direction. This operation is repeated with a value not exceeding the minimum track width of each magnetic head, and changing the radial position so that the magnetic layers of entire recording zones 24 are magnetized in the same direction. Since each magnetic layer is discontinuous in each servo sector 22 and index line 23, the output corresponding to each pattern position of the magnetic layer can be detected by the magnetic head. In other words, since the patterns of the servo information 22a are continuous lines in the radial direction at the leading portion 22c throughout all the recording tracks, a predetermined start of the signal output is produced at all the radial positions, but since the patterns come in and out alternately on the center line of each track at the trailing portion 22d, the shapes of the signal outputs are different depending on the radial positions. The peak values or shapes of these two outputs are determined by the time positions of the trailing portion 22d and they become equal to each other when the magnetic head reaches the center line of each track. Therefore, the difference of the peak values of the two pulse outputs having different time positions from the trailing portion 22d of the pattern of each servo information 22a is generated by a position information circuit and the positioning mechanism is driven so that this value becomes zero. In this manner, the magnetic head can be positioned to the center line of each information track. The output signal reproduced in this case is the same as the so-called "tri-bit" pattern that has been obtained by conventional magnetic write/read and its basic operation can be easily understood by those skilled in the art.

On the other hand, at the portion of the data sector 21, the magnetic film pattern is only the track separators 20a and all of them are formed in the circumferential direction and do not have magnetic discontinuous points. Accordingly, leakage flux does not occur and the magnetic head reproduces only the data signal.

In the magnetic disk recording apparatus of this embodiment, the radial position on the positioning mechanism of one magnetic head is assembled so that it is in high precision conformity with others. In other words, the plurality of magnetic heads on one head support mechanism are aligned and fixed highly accurately at their radial positions with one another at the time of assembly of the magnetic head and when they are fixed to the magnetic head positioning mechanism, they are fixed after their radial positions are adjusted in the same way as has been made in the conventional disk pack exchange type magnetic disk recording apparatuses.

Figure 6:
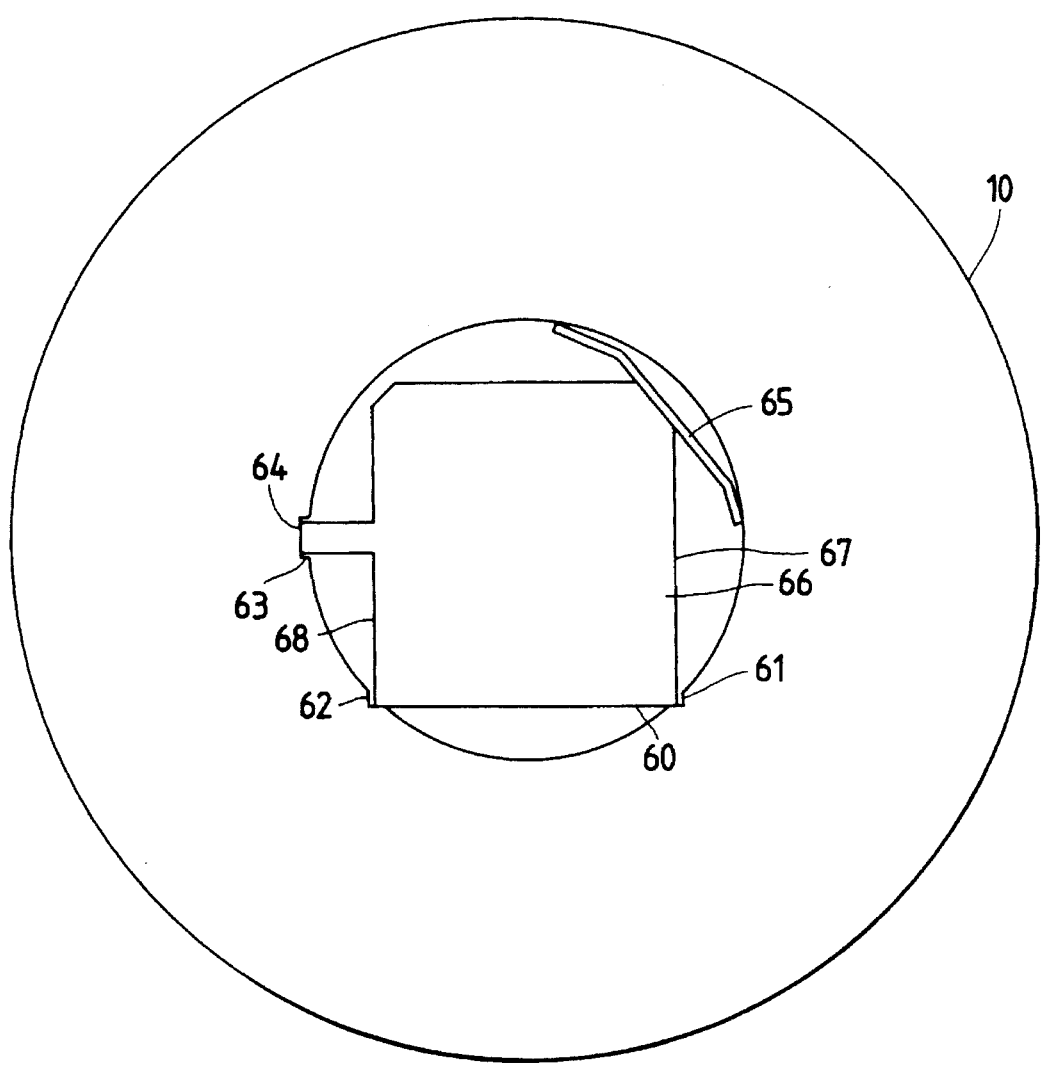
FIG. 6 is a schematic view showing the magnetic disk of the invention and another example of fixing to the hub.

The re-positioning time of the switching from one to another of the magnetic heads can be shortened by forming the two positioning notches on the inner diameter portion and bringing the positioning pattern on the magnetic disk into conformity with the rotation driving center of the magnetic disk recording apparatus. However, the present invention is not particularly limited to this structure. For example in FIG. 6, the magnetic disk 10 can be positioned to the hub 66 of the recording apparatus by aligning the horizontal position with three notches 61, 62 and 63, in the disk 10 and by one each straight line surfaces 60, 68, 67 and a projection having contact portion 64 as shown in FIG. 6. Leaf spring 65 biases the contact portion at the terminal end of the projection radially against the adjacent bottom surface of notch 63, biases surface 68 against the adjacent surface of notch 62 and biases surface 60 against the adjacent surface of notch 61.

Figure 7:
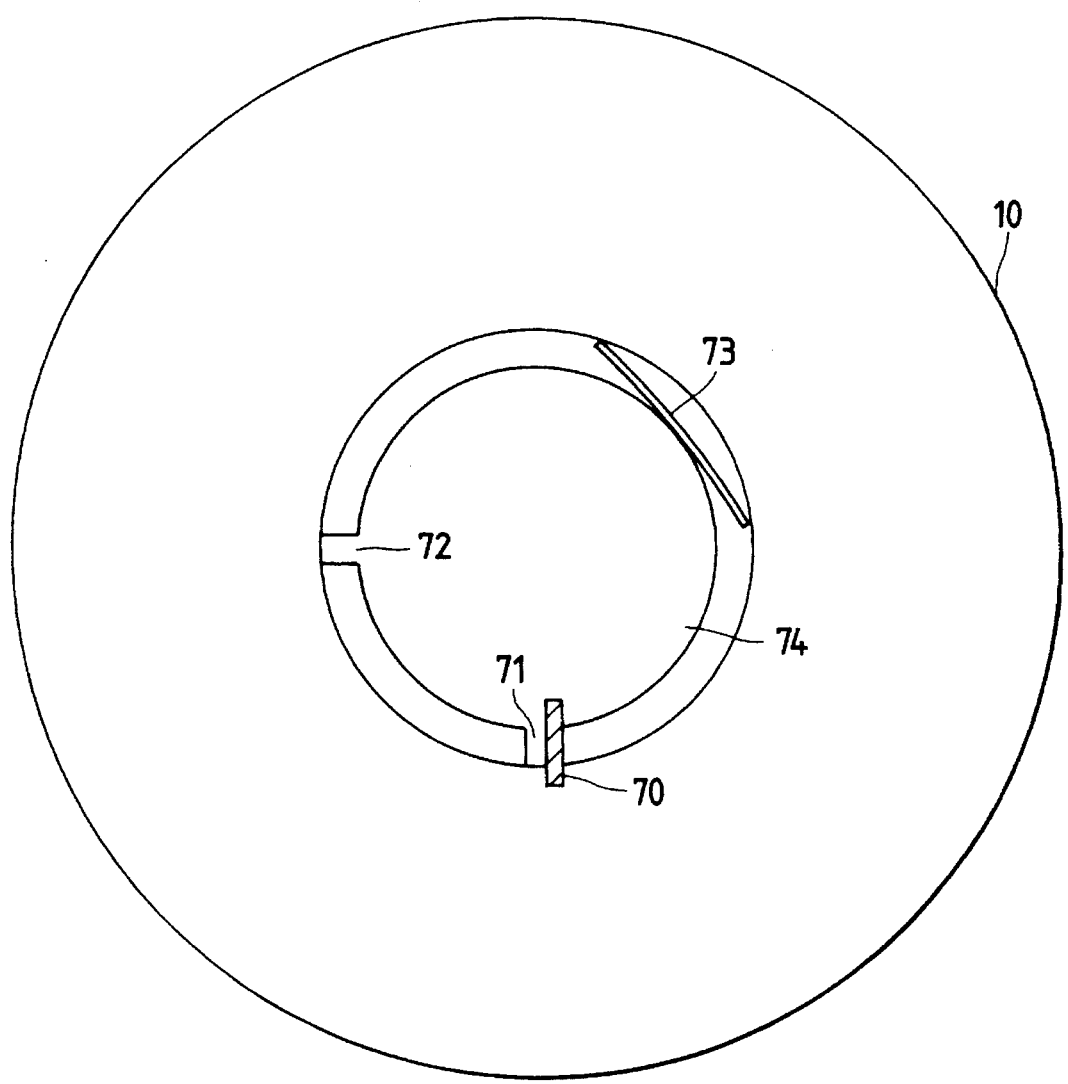
FIG. 7 is a schematic view showing the magnetic disk of the invention and another example fixing to the hub.

As shown in FIG. 7, it is possible to form only one notch 70 in the inner diameter of the magnetic disk 10, to align the rotation angle position of the magnetic disk by this notch 70 and to align the radial position by two projections 71 and 72 formed on the hub 74.

Figure 8A:
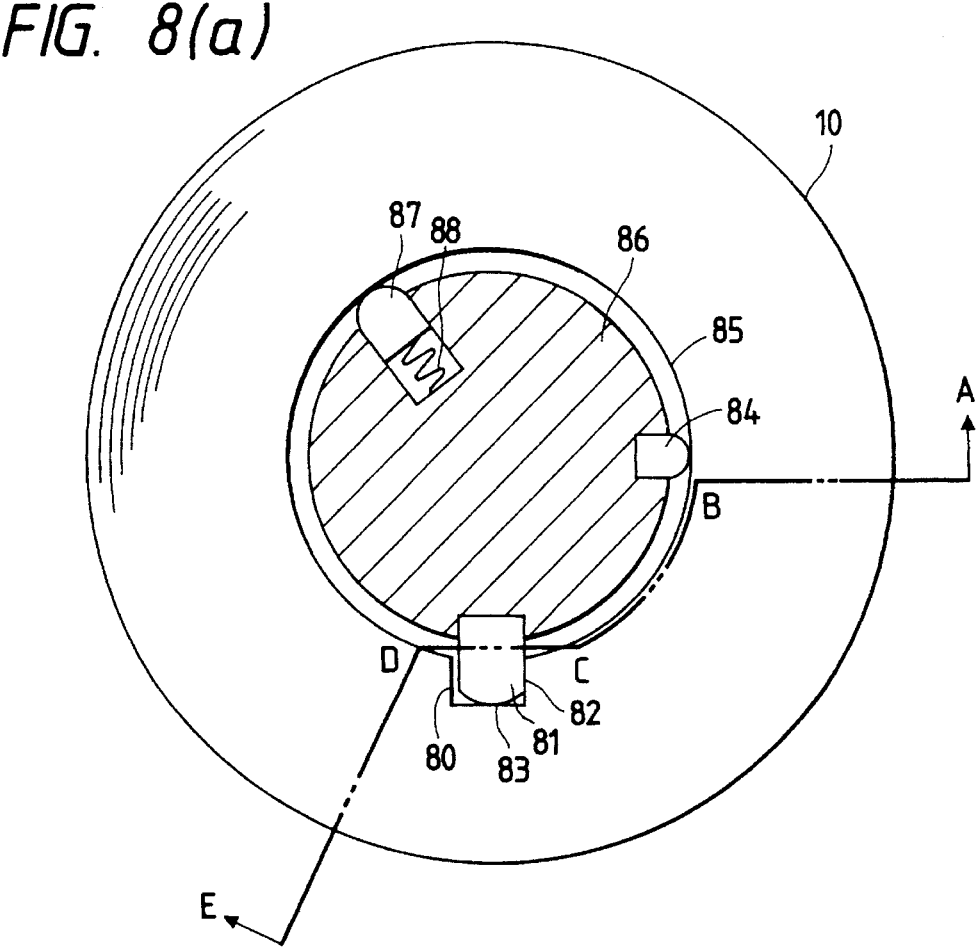
FIGS. 8(a) and (b) are schematic views showing the magnetic disks of the invention and another hub fixing method.
Figure 8B:
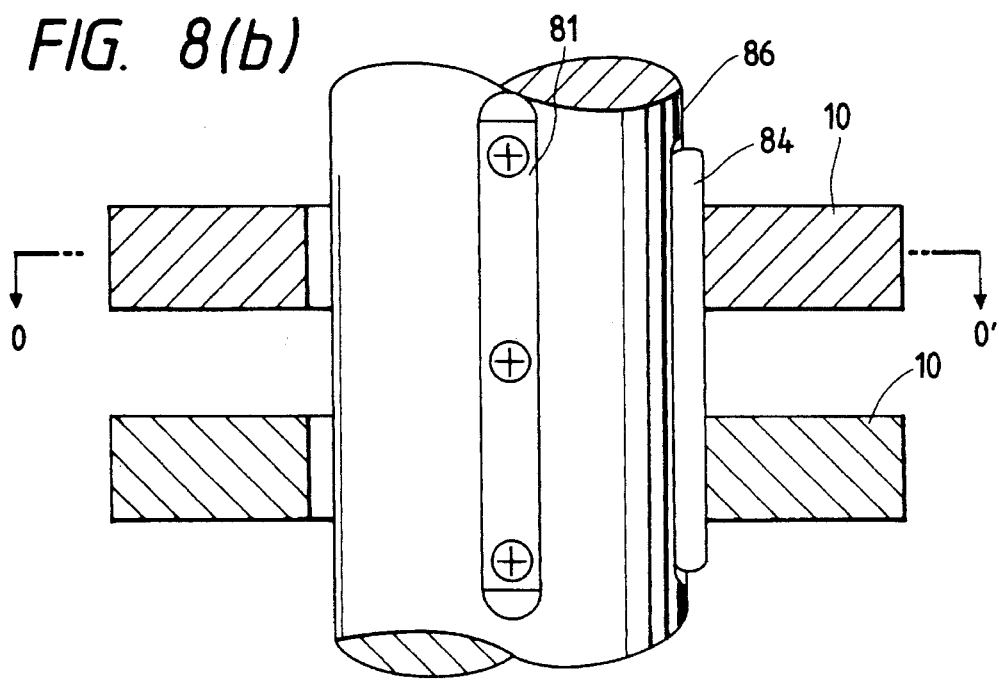

Furthermore, it is possible to fix positioning keys 81 and 84 rigidly on the outer diameter portion of the hub 86 and to make positioning at three points by biasing with a spring urged piston 87 and spring 88, that is, the side surfaces 82, 83 of key 81 contact the surface notch 80 of the magnetic disk, 10 and the outer diameter surface of the other key 84 contacts the inner diameter 85 of disc 10, as shown in FIGS. 8(a) and 8(b).

It is further possible to use a positioning mark disposed in advance on the surface of the magnetic disk, not shown, in place of the notch on the inner diameter portion as the positioning reference, to detect optically the positioning mark of the magnetic disk when the disk is fixed to the hub of the magnetic disk recording apparatus and to position the inside surface of the magnetic disk to the center of rotation. In these cases described above, positioning at the time of production of the magnetic disk uses fully the positioning reference in accordance with the method described above.

Figure 9:
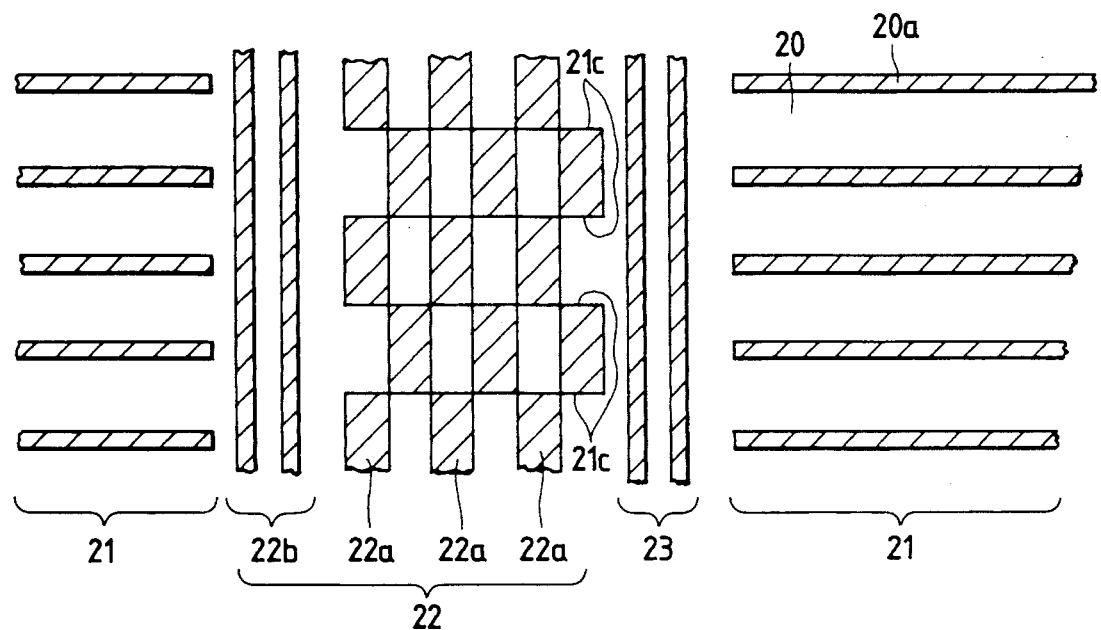
FIG. 9 is a schematic view showing another example of the servo information of the present invention.

Though this embodiment has been described with reference to the pattern shown in FIG. 2, the patterns of the magnetic layer/alumina film are not particularly limited thereto and a grid-like pattern which switches at the center of each track center may be used for the servo information as shown in FIG. 9. These patterns repeat every second track, and the magnetic head might be positioned to tracks other than the desired track at the time of switch of the magnetic heads if the eccentric distance between the center of the recording track 20 and the center of rotation of the hub 50 exceeds the width of one track. However, the arrangement wherein the repeating length of the servo information pattern exceeds the two tracks is well known to those skilled in the art. It is possible, for example, to use three or more kinds of gaps between the leading edge portion and trailing edge portion of the servo information 22a in place of the two kinds shown in FIG. 2. In these cases, the magnetic head, even when it is switched, can be positioned to the desired track if the eccentric distance between the center of the recording track 20 and the center of rotation of the hub 50 is below ½ of the repeating unit.

Figure 10:
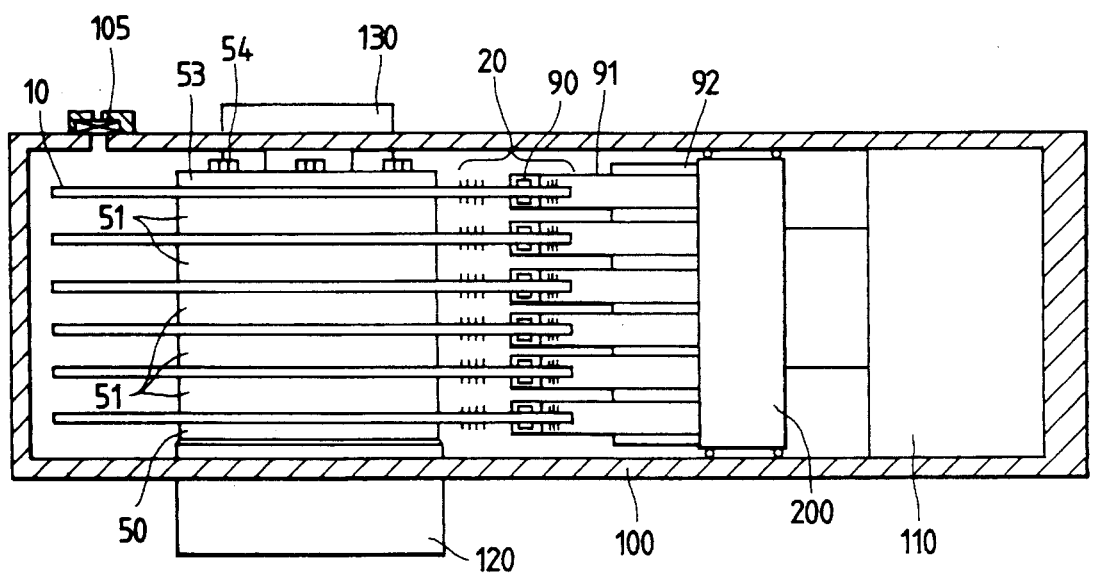
FIG. 10 shows a magnetic disk storage that employs the present invention.

FIG. 10 shows a magnetic disk storage that utilizes the present invention. Six magnetic recording disks 10, each having magnetic recording tracks 20, are made by the above described method using a pattern of a change in shape or materials. They are stacked on the hub 50 while inserting spacers having a predetermined size between the disks in order to keep their gaps constant, and they are fixed by a fixing screw 54 from above through a hub cover 53.

Hub 50 is supported on journal bearing 130 and rotated by the drive motor 120 in the housing 100. Magnetic tracks shown in FIGS. 1,2, or 9 are fabricated on the recording surfaces of magnetic disks 10. The disks are fixed on the hub within small errors of eccentricity as previously explained. Information is recorded and/or reproduced on the magnetic tracks by magnetic heads 90.

Twelve magnetic heads 90 are placed on both sides of the six magnetic recording disks. They are supported by leaf springs 91 and are mounted on the support arm 92. All the magnetic heads 90 are fixed on the carriage 200 simultaneously. The magnetic heads are positioned to a desired recording track by the accessing of carriage 200 which moves to the radial direction of the magnetic recording disks by the actuating mechanism 110.

The recording and/or reproducing position of the twelve magnetic recording heads are aligned to make the error of eccentricity of all the disks within 1 micrometer at the time of fixing the magnetic heads on the carriage.

The apparatus are equipped within the housing 100 and dust particles from outside the housing are kept out through the filter unit 105 and the inside air pressure is kept the same as that of the outside.

Though the description given above deals with the case where the present invention is applied to the magnetic disk and to the magnetic disk recording apparatus, the information recording method is not particularly limited thereto, and exactly the same effect can of course be obtained when an optical recording system is employed.

In accordance with the present invention described above in detail, the information recording disk having the recording tracks formed on its information recording surface can be fixed to the spindle with a small eccentric distance between the center of the recording track and the center of rotation of the information recording disk. Accordingly, the following error of the access mechanism can be reduced. Even when a plurality of information recording disks are fixed to the same spindle, the centers of the recording tracks on all the disks can be accurately brought into conformity with one another. Therefore, when at least two recording/reproduction mechanisms corresponding to these information recording disks are mounted to one driving mechanism and positioning in the radial direction is carried out, the positioning time can be reduced remarkably even when the recording/reproduction mechanism is switched from one to the other. Furthermore, when recording/reproduction of one track is complete and shifts to the recording track of the next information recording disk surface, the waiting time until the start of the recording/reproduction start position of that disk surface can be shortened.

In accordance with the present invention, the position reference signal pattern on each recording track is formed at the time of production of the information recording disk. Therefore, it is not necessary to form the position reference signal after the assembly of the recording apparatus and the assembly step of the recording apparatus can be simplified.

In the magnetic disk structure of the present invention, the alumina film projects from the magnetic layer and prevents the contact of the head with the magnetic layer. Accordingly, it is possible to remarkably reduce the probability that the information recorded on the magnetic layer cannot be reproduced due to sliding contact with the magnetic head. Since the patterns of track separators and servo sectors are simultaneously formed, alignment accuracy of the recording track center with the servo information can be improved more highly than when only the track separator portion is formed on the magnetic disk surface and the servo information is recorded after the assembly of the recording apparatus.

In accordance with the present invention, machining of the inner and outer diameters of the information recording disk can be made by utilizing the same positioning information as that used for the recording track and the eccentric distance between the inner and outer diameters can be reduced when the disks are assembled to the recording apparatus and the rotating vibration of the recording apparatus during the high speed rotation can be reduced. Furthermore, the recordable range of each information recording surface can be expanded.

In the present invention, each information recording disk is biased to the hub and its position in the surface direction is aligned, and the movement of the disk, even when acceleration is applied thereto at the start/end of rotation, can be prevented. Accordingly, the fixing force for fixing the disk to the hub can be reduced, deformation of the hub and disk due to the fixing force can be reduced and planar accuracy can be improved. Moreover, since deformation of the hub can be reduced, strength of the hub can be reduced and the constituent components can be made light in weight and compact in size.

In accordance with the present invention, furthermore, an extremely easy-to-use and highly reliable information recording apparatus can be accomplished because it uses the information recording disk(s) which has the recording tracks formed in advance on its information recording surface(s) and makes it possible to make high precision positioning.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A disk drive for rotatably driving an information recording disk of the type having inner and outer diameter edges and opposed surfaces, for carrying information to be read by an information convertor, comprising:

means establishing a center of rotation;

a plurality of positioning servo signal means for signaling track alignment information to an information convertor and being on one of the surfaces of the disk, and each being constructed of a permanent change of said one surface, said positioning servo signal means being spaced circumferentially about said disk sufficiently to define a signal center of symmetry, and each of said positioning servo signal means further being repeated in the radial direction with respect to said center of rotation, wherein the eccentric distance of said signal center of symmetry from said center of rotation is smaller than half the repeating unit length of said positioning servo signal means in the radial direction;

the information recording disk including a notch having two circumferentially-spaced opposed abutment surfaces on one of said inner and outer diameter edges for referencing said signal center of symmetry and for abutment reference with a disk mounting of the disk drive for determining said center of rotation, wherein said notch includes a third abutment surface for abutment reference with the disk mounting for determining the angular position of said positioning servo signal means; and a hub mounting said disk.

2. A disk drive for rotatably driving an information recording disk of the type having inner and outer diameter edges and opposed surfaces, for carrying information to be read by an information convertor, comprising:

means establishing a center of rotation;

a plurality of positioning servo signal means for signaling track alignment information to an information convertor and being on one of the surfaces of the disk, and each being constructed of a permanent change of said one surface, said positioning servo signal means being spaced circumferentially about said disk sufficiently to define a signal center of symmetry, and each of said positioning servo signal means further being repeated in the radial direction with respect to said center of rotation, wherein the eccentric distance of said signal center of symmetry from said center of rotation is smaller than half the repeating unit length of said positioning servo signal means in the radial direction;

the information recording disk including a notch having two circumferentially-spaced opposed abutment surfaces on one of said inner and outer diameter edges for referencing said signal center of symmetry and for abutment reference with a disk mounting of the disk drive for determining said center of rotation; and a hub mounting said disk.

* * * * *